United States Patent [19]

Harwood

[11] 4,441,137
[45] Apr. 3, 1984

[54] HIGH VOLTAGE PROTECTION FOR AN OUTPUT CIRCUIT

[75] Inventor: Leopold A. Harwood, Bridgewater, N.J.

[73] Assignee: RCA Corporation, New York, N.Y.

[21] Appl. No.: 412,899

[22] Filed: Aug. 30, 1982

[51] Int. Cl.$^3$ ............................................. H02H 7/20
[52] U.S. Cl. ...................................... 361/91; 361/56; 361/111; 330/298; 357/43; 358/243
[58] Field of Search .......................... 361/56, 91, 111; 330/298, 207 P; 357/35, 42, 43; 358/243, 190

[56] References Cited

U.S. PATENT DOCUMENTS

| | | | |
|---|---|---|---|
| 3,819,952 | 6/1974 | Enomoto et al. | 307/202 |
| 3,882,529 | 5/1975 | Warner, Jr. | 361/91 X |
| 4,106,048 | 8/1978 | Khajezadeh | 357/40 |
| 4,133,000 | 1/1979 | Greenstein | 357/46 |
| 4,264,941 | 4/1981 | London | 361/56 X |
| 4,282,556 | 8/1981 | Ipri | 361/111 X |
| 4,302,792 | 11/1981 | Harwood | 361/92 |

FOREIGN PATENT DOCUMENTS 2095909  10/1982  United Kingdom .................. 361/91

OTHER PUBLICATIONS

"Microelectronics, Digital and Analog Circuits and Systems," Jacob Millman, p. 680, (1980), McGraw-Hill, N.Y.

"Advanced Electronics Circuits," by V. Tietze and Ch. Schenk, p. 152. (1978 Springer-Verlag, N.Y.).
RCA Linear Integrated Circuits Technical Bulletin, (File No. 688), for CA 3121E, (FIG. 2, p. 537). Drawing labeled "Exhibit A," with FIGS. 1 and 2.

*Primary Examiner*—Patrick R. Salce
*Attorney, Agent, or Firm*—Eugene M. Whitacre; Paul J. Rasmussen; R. H. Kurdyla

[57] ABSTRACT

A protection circuit is coupled between a low voltage signal processing semiconductor device subject to damage by high voltage transients, and a signal output terminal at which high voltage transients can appear. The protection circuit comprises a first transistor arranged as an emitter follower for normally conducting signals from the semiconductor device to the output terminal, and a second transistor of opposite conductivity type. The base and emitter electrodes of the first transistor are directly connected to the base and emitter electrodes of the second transistor, respectively, such that the second transistor is normally non-conductive. Transient currents associated with negative high voltage transients at the output terminal are diverted to a point of operating potential via the first transistor. The second transistor is rendered conductive in response to positive high voltage transients at the output terminal for diverting associated transient currents to a point of operating potential.

6 Claims, 1 Drawing Figure

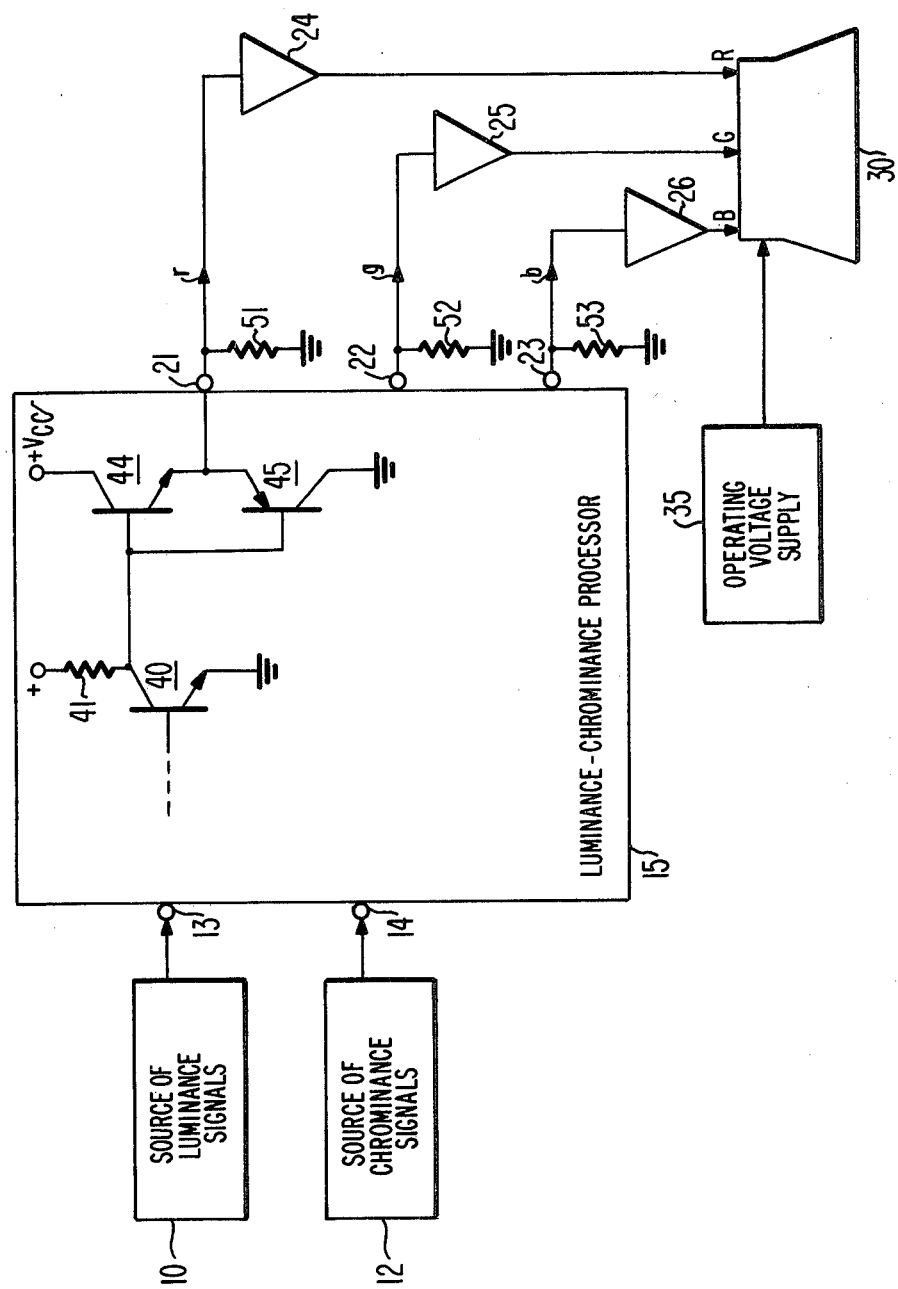

HIGH VOLTAGE PROTECTION FOR AN OUTPUT CIRCUIT

This invention concerns a circuit for protecting an output signal processing semiconductor device from damage due to electrical stress caused by high voltage transients of either positive or negative polarity.

High voltage transients capable of damaging a semiconductor device such as a transistor can be developed in various ways. In a television receiver including an image reproducing kinescope, for example, such transients can be produced when high voltage kinescope arcing occurs. The transients can be of a magnitude, polarity and duration sufficient to damage or destroy transistors included in signal processing circuits of the receiver such as by exceeding the reverse breakdown voltage of the transistors and causing excessively high levels of junction currents to flow. This effect is typically observed when high voltage transients are induced at circuit points or terminals to which the transistors are connected, and is particularly troublesome in a system comprising an integrated circuit containing sensitive, low level signal processing transistor circuits. Excessive transient induced currents can destroy transistor semiconductor junctions, and can cause the current gain characteristic of a transistor to be permanently degraded.

Various protection arrangements can be utilized to suppress the effects of high voltage transients.

Suitably poled semiconductor diodes can be employed at circuit points for bypassing transients away from sensitive transistor circuits to be protected. Diodes fabricated with non-standard techniques or configurations may be required for this purpose. Diodes with these requirements are often undesirable, particularly in an integrated circuit environment, since these requirements complicate the process of integrated circuit manufacture. In any case, care must be taken to ensure that the diodes have sufficient power dissipation capability to withstand the electrical stress associated with the transients without being destroyed, and that such diodes alone or together with any associated threshold level determining bias networks do not impair the desired impedance characteristics or high frequency response of the signal circuits being protected.

Resistors or impendance devices particularly designed to suppress high voltage transients also can be used. However, such devices may be too costly or otherwise impractical from a design standpoint in many circuit applications, and may impair the impedance characteristics and high frequency response of signal processing circuits with which they are used.

An active transistor protection circuit also has been used in combination with a sensing impedance, coupled both to a circuit point at which high voltage transients may appear and to the circuit to be protected. With this arrangement the protection transistor serves to divert transient induced currents away from the circuit to be protected, when the protection transistor is activated in response to a threshold conduction voltage developed across the sensing impedance. This arrangement is undesirable when used to protect a signal processing circuit since the sensing impedance alters the impedance otherwise associated with the protected signal processing circuit, and can also attenuate high frequency signals normally appearing at the terminal by forming a low pass filter together with any parasitic capacitance that may appear at the terminal.

A transient protection circuit arranged according to the present invention avoids the disadvantages mentioned above and is particularly suitable for fabrication in an integrated circuit that also contains the circuit to be protected. Specifically, the protection circuit described herein provides protection in the presence of high voltage transients of both positive and negative polarity, without disturbing the desired signal processing characteristics (e.g., high frequency response or impedance characteristics) of the protected circuit.

A protection circuit according to the present invention is included in a signal processing system comprising a signal output terminal at which spurious high voltage transients may appear, and a semiconductor device susceptible of damage from electrical stress caused by high voltage transients. The protection circuit comprises a first transistor of one conductivity type for normally conducting signals from the semiconductor device to the output terminal via an emitter output, and a second normally non-conductive transistor of an opposite conductivity type. The base electrodes of the first and second transistors are connected together, the emitter electrodes of the transistors are connected together and to the output terminal, and the collector electrodes of the transistors are connected to respective points of operating potential. Transient currents associated with high voltage transients of one polarity at the output terminal are diverted via the collector-emitter path of the first transistor to the associated point of operating potential. The second transistor is rendered conductive in response to voltage transients of the opposite polarity at the output terminal, for diverting associated transient currents to the associated point of operating potential via the collector-emitter path of the second transistor.

The drawing shows a portion of a television receiver including a network incorporating a protection circuit according to the present invention.

Luminance signals from a source 10 and chrominance signals from a source 12 are supplied to separate signal input terminals 13 and 14 of a luminance and chrominance signal processor 15 included in a color television receiver. Processor 15 (e.g., an integrated circuit) combines the luminance and chrominance signals, as known, to develop r, g and b color image signals at output terminals 21, 22 and 23, respectively. The color signals are amplified by kinescope driver amplifiers 24, 25 and 26 which provide high level amplified color video signals R, G and B to separate intensity control cathode electrodes of a color kinescope 30. An operating voltage supply 35 develops plural operating voltages for kinescope 30. These voltages include a high voltage on the order of 25,000 volts for biasing the anode electrode of kinescope 30, and voltages on the order of a few hundred volts for biasing other electrodes of kinescope 30 (e.g., cathode, screen grid and focus electrodes).

Processor 15 includes output circuits, coupled to output terminals 21, 22 and 23, that can be damaged or destroyed when high voltages appear on these terminals. In a television receiver, the primary source of such high voltage is transients caused by arcing of the kinescope. Kinescope arcing can occur between the high voltage anode electrode and the receiver chassis when the receiver is being serviced, for example. Kinescope arcing also can occur unpredictably between the anode and one or more of the other (lower potential) electrodes of the kinescope when the receiver is in normal operation. In any case, kinescope arcing results in a high voltage transient which is oscillatory in nature with positive and negative voltage peaks often in excess of one hundred volts at the circuit terminals, and which exhibits a duration of from one to several microseconds.

The likelihood of semiconductor circuit devices being destroyed or damaged by high voltage transients increases when such circuits are located in the vicinity of high voltage sources and associated high voltage transients. Here, the signal output terminals of processor 15 are connected to kinescope driver amplifiers 24–26 which supply high voltage output signals to cathode electrodes of kinescope 30. Kinescope drivers 24–26 are typically biased from a high voltage supply (e.g., +230 volts) such as may be provided by source 35, which also supplies high and very high operating voltages for kinescope 30 as mentioned previously.

Processor 15 includes plural signal processing networks for applying respective color signals to output terminals 21–23. A portion of the signal processing and output coupling network associated with the red (r) color signal coupled to terminal 21 is shown as comprising transistors 40, 44, 45 and resistor 41 arranged as shown. Similarly arranged signal processing and output coupling networks are associated with the g and b signal output terminals 22 and 23.

Transistor 40 comprises a low voltage, low power signal amplifier transistor for developing amplified signals across collector load resistor 41. Transistor 40 is susceptible of being damaged or destroyed if large transient voltages, such as can be induced at output terminal 21 by kinescope arcing, are permitted to be applied to transistor 40. Such transients (often greater than one hundred volts peak-to-peak amplitude) can also damage or destroy load resistor 41 when transistor 40 and resistor 41 are formed in the same integrated circuit, since small area integrated circuit resistors typically cannot rapidly dissipate a large amount of thermal energy such as may be associated with large transient induced currents.

Signal transistor 40 and resistor 41 are protected from the effects of large transient voltages by means of the circuit comprising NPN transistor 44 and PNP transistor 45. Transistor 44 is normally conductive for signal processing purposes and is arranged as an emitter follower for coupling output signals from transistor 40 to terminal 21 at a low emitter output impedance. The emitter of follower transistor 44 is returned to ground reference potential via a load resistor 51 located external to integrated circuit processor 15. Locating resistor 51 external to processor 15 is considered desirable to reduce the heating of integrated circuit processor 15 due to the power dissipated by resistor 51. Resistor 51 could be included in processor 15, however. The collector of follower transistor 44 is directly connected to a source of positive DC operating potential $+V_{cc}$.

The base and low impedance emitter electrodes of PNP transistor 45 are directly connected to the base and lowe impedance emitter electrodes of NPN transistor 44, respectively. The collector of transistor 45 is directly connected to ground reference potential. Under normal conditions, the base-emitter junction bias voltage of PNP transistor 45 is directly established by the base-emitter junction voltage of normally conductive transistor 44. Thus under normal signal processing conditions the base-emitter junction of PNP transistor is reverse-biased by the voltage developed across the forward-biased base-emitter junction of transistor 44. Accordingly, PNP transistor 45 is normally non-conductive and has no influence upon the signals normally conducted to output terminal 21 via amplifier transistor 40 and follower transistor 44.

Currents associated with a negative-going high voltage transient appearing at terminal 21 are conducted by NPN transistor 44, which provides a current path for diverting such transient currents away from signal amplifier transistor 40. Transient induced currents in this path flow from the source of operating potential $+V_{cc}$, through the collector-emitter path of transistor 44 and terminal 21, to the source of transient voltage. PNP transistor 45 remains non-conductive in response to negative transients.

A positive-going high voltage transient at terminal 21 causes PNP transistor 45 to become forward biased, whereby conductive transistor 45 provides a current path for diverting currents induced by negative transients away from signal transistor 40. In this case the transient induced currents are diverted to ground via the emitter-to-collector path of transistor 45. Also, the base current of transistor 45 increases proportionally with the much larger transient induced emitter current of transistor 45, causing the base voltage of NPN transistor 44 to increase proportionally. If the base voltage of transistor 44 becomes large enough to forward bias the base-to-collector junction of transistor 44, an additional path for diverting transient induced current results. This path comprises the emitter-to-base junction of PNP transistor 45, the forward biased base-to-collector junction of NPN transistor 44, and the $+V_{cc}$ voltage source. Any current conducted in the latter path is significantly less than the transient induced current diverted to ground via the emitter-collector path of PNP transistor 45.

The described protection circuit advantageously requires few components, and transistors 44 and 45 need not be large or high power devices. Thus the protection circuit is advantageously used in an integrated circuit with limited available area. Transistors 44 and 45 inherently exhibit self-limited transient current conduction when conducting in response to high voltage transients. Such inherently limited transient current conduction is attributable to the distributed collector resistances of transistors 44 and 45, and permits use of transistors 44 and 45 with conventional base-emitter junction configurations. In addition, the protection circuit does not alter the output frequency response or the output impedance of processor 15 for normal signal processing. In the latter regard follower transistor 44 normally provides output signals at a low impedance in accordance with the input requirements of kinescope driver 24, while also providing protection in the presence of negative high voltage transients.

Transistors 44 and 45 can be conventionally structured devices. In the case of high voltage transients associated with kinescope arcing, for example, voltage transients are induced at output terminal 21 through an effective high impedance which, in combination with the low emitter impedances of transistors 44 and 45, yields a significantly attenuated voltage transient at terminal 21. However, potentially destructive high currents are typically associated with such transients. As mentioned previously, transient currents conducted by transistors 44, 45 are limited in magnitude by the inherent distributed collector resistances of these transistors. In addition, the thermal energy associated with large transient currents can be sustained by transistors 44 and since the relatively large collector region of a conventional transistor assists to non-destructively distribute such thermal energy.

The described protection circuit is suitable for protecting any semiconductor device (e.g., including transistors, diodes and resistors particularly in an integrated circuit) having a relatively small area configuration incapable of safely dissipating or limiting large amounts of energy such as can be associated with high voltage transients.

What is claimed is:

1. In a signal processing system comprising an output terminal at which spurious high voltage transients may appear; and a semiconductor device susceptible of damage from electrical stress caused by high voltage transients; a protection circuit comprising:

a normally conductive first transistor of one conductivity type having an input first electrode coupled to said semiconductor device, a low impedance second electrode coupled to said output terminal, and a third electrode coupled to a first operating potential and with said second electrode determining a main current conduction path of said first transistor; said first transistor being normally operative for coupling signals from said semiconductor device to said output terminal, and being operative for diverting current transients associated with high voltage transients of one polarity to said first operating potential via said main current path of said first transistor; and a second, normally non-conductive, transistor of an opposite conductivity type with a first electrode coupled to said first electrode of said first transistor, a low impedance second electrode coupled to said second electrode of said second transistor and to said output terminal, and a third electrode coupled to a second operating potential and with said second electrode determining a main current conduction path of said second transistor; said second transistor being rendered conductive in response to transients appearing at said output terminal with an opposite polarity for diverting associated transient currents to said second operating potential via said main current path of said second transistor.

2. A circuit according to claim 1, wherein said first and second electrodes of said first transistor define a semiconductor junction normally exhibiting a bias voltage thereacross; and said first and second electrodes of said second transistor define a semiconductor junction the bias of which is normally primarily established by the bias voltage developed across said semiconductor junction of said first transistor, for maintaining said second transistor normally non-conductive.

3. Apparatus according to claims 1 or 2, wherein said first, second and third electrodes of said first and second transistors respectively correspond to base, emitter and collector electrodes.

4. A circuit according to claim 3, wherein said first transistor is an NPN transistor for diverting transient currents associated with high voltage transients of negative polarity; and said second transistor is a PNP transistor for diverting transient currents associated with high voltage transients of positive polarity.

5. A circuit according to claim 1, and further comprising utilization means for receiving signals from said output terminal; and an emitter load impedance for said first transistor coupled between said output terminal and said utilization means.

6. A circuit according to claim 1, wherein said system comprises a television receiver including an image reproducing kinescope susceptible of producing high voltage transients associated with kinescope arcing;

a source of operating supply voltage including high operating voltages for said kinescope; and a kinescope driver amplifier for supplying to said kinescope an amplified version of signals developed at said output terminal.

* * * * *